(12) United States Patent      (10) Patent No.:    US 8,045,129 B2
Kang et al.                               (45) Date of Patent:     Oct. 25, 2011

(54) DISPLAY DEVICE AND METHOD OF MANUFACTURING THE SAME

(75) Inventors: Hee Kwang Kang, Seoul (KR); Jun Hyeok Yu, Seoul (KR); Mi Young Do, Suwon-si (KR); Il Ho Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 256 days.

(21) Appl. No.: 12/314,702

(22) Filed: Dec. 15, 2008

(65) Prior Publication Data

US 2009/0279013 A1     Nov. 12, 2009

(30) Foreign Application Priority Data

May 8, 2008    (KR) ................... 10-2008-0042668

(51) Int. Cl.
*C09K 19/02*        (2006.01)
(52) U.S. Cl. ............................. 349/175; 349/49
(58) Field of Classification Search ............ 349/48; 345/175
See application file for complete search history.

(56) References Cited

U.S. PATENT DOCUMENTS

| 2006/0109222 A1* | 5/2006 | Lee et al. ............ 345/88 |
| 2008/0055502 A1* | 3/2008 | Wu et al. ............ 349/38 |
| 2008/0186288 A1* | 8/2008 | Chang ................ 345/174 |

FOREIGN PATENT DOCUMENTS

CN          1982960        6/2007

* cited by examiner

*Primary Examiner* — Phu Vu
(74) *Attorney, Agent, or Firm* — McKenna Long & Aldridge LLP

(57) ABSTRACT

A display device includes a plurality of gate lines and a plurality of data lines crossing each other on a first substrate, to define a pixel; a first thin film transistor in a portion where the gate lines and the data lines cross each other; a plurality of position detection lines on the first substrate, the position detection lines spaced a constant distance from the data lines and crossing the gate lines; a second thin film transistor for detecting a position, in a portion on the first substrate where the gate lines and the position detection lines cross each other; a protrusion pattern protruding from a second substrate and corresponding to a drain electrode of the second thin film transistor; and a transparent conductive layer on the protrusion pattern, electrically connected to the drain electrode when touching.

9 Claims, 6 Drawing Sheets

DISPLAY DEVICE AND METHOD OF MANUFACTURING THE SAME

The present application claims the benefit of Korean Patent Application No. 10-2008-0042668 filed on May 8, 2008, which is hereby incorporated by reference for all purposes as if fully set forth herein.

BACKGROUND OF THE INVENTION

1. Field of the Invention

The present invention relates to a display device and a method of manufacturing the same, which can simplify structure thereof.

2. Discussion of the Related Art

Personal computers, portable transmitting devices, and other personal data-processing devices process texts and graphics with various input devices including keyboards, mice and digitizers.

Such input devices, as interfaces corresponding to the purpose of PCs, continue to evolve for simple and easy operation.

Today, beyond meeting requirements relating to a common function of an input device, delicate technologies become more important, which includes reliability, services with new functions, durability, a design allowing for materials and substances, and manufacturing and producing methods.

Specifically, touch panels are well known as an input device that is simple to operate, and easy to input data in mobile situations, and makes it possible to input characters without an additional input device.

Such a touch panel commonly includes an upper substrate having upper electrodes and a lower substrate having lower electrodes, in which the upper and lower substrates are spaced apart from each other. When touching, with an input member such as a pen or a finger, a certain point of the upper substrate including the upper electrodes, the upper electrode in the upper substrate corresponding to the touched point is electrically connected to the lower electrode disposed in the lower substrate, then a voltage value changed depending on a resistance value or capacitance value corresponding to the touched point is determined, and then position coordinates are detected at a position detection driver according to the change of potential difference.

Such a touch panel is disposed on a top of a display device such that a user directly touches e.g., an icon displayed on the display device with his/her finger or stuff and desired content is selected for the user.

However, since the touch panel is disposed on the top of the display device, a product including the touch panel becomes thick and large. Also, position detection drivers should be provided for supplying a driving voltage for an x-axis and a y-axis, which results in complicated structure.

SUMMARY OF THE INVENTION

Accordingly, the present invention is directed to a liquid crystal display device that substantially obviates one or more of the problems due to limitations and disadvantages of the related art.

An advantage of the present invention is to provide a display device and a method of manufacturing the same, which can simplify structure thereof.

Additional features and advantages of the invention will be set forth in part in the description which follows and in part will become apparent from the description may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a display device includes a plurality of gate lines and a plurality of data lines crossing each other on a first substrate, to define a pixel; a first thin film transistor in a portion where the gate lines and the data lines cross each other; a plurality of position detection lines on the first substrate, the position detection lines spaced a constant distance from the data lines and crossing the gate lines; a second thin film transistor for detecting a position, in a portion on the first substrate where the gate lines and the position detection lines cross each other; a protrusion pattern protruding from a second substrate and corresponding to a drain electrode of the second thin film transistor; and a transparent conductive layer on the protrusion pattern, electrically connected to the drain electrode when touching.

In another aspect of the present invention, a method of manufacturing a display device, the method includes forming a thin film transistor substrate comprising: forming a first thin film transistor in a portion where gate lines and data lines cross each other; and forming a second thin film transistor in a portion where and the gate lines and position detection lines spaced a constant distance from the data lines cross each other; and forming a color filter substrate comprising a protrusion pattern in a portion corresponding to a drain electrode of the second thin film transistor.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiment(s) and together with the description serve to explain the principle of the invention.

In the drawings.

DETAILED DESCRIPTION OF THE EMBODIMENTS

Reference will now be made in detail to the embodiments of the present invention, examples of which are illustrated in the accompanying drawings.

Figure 1:
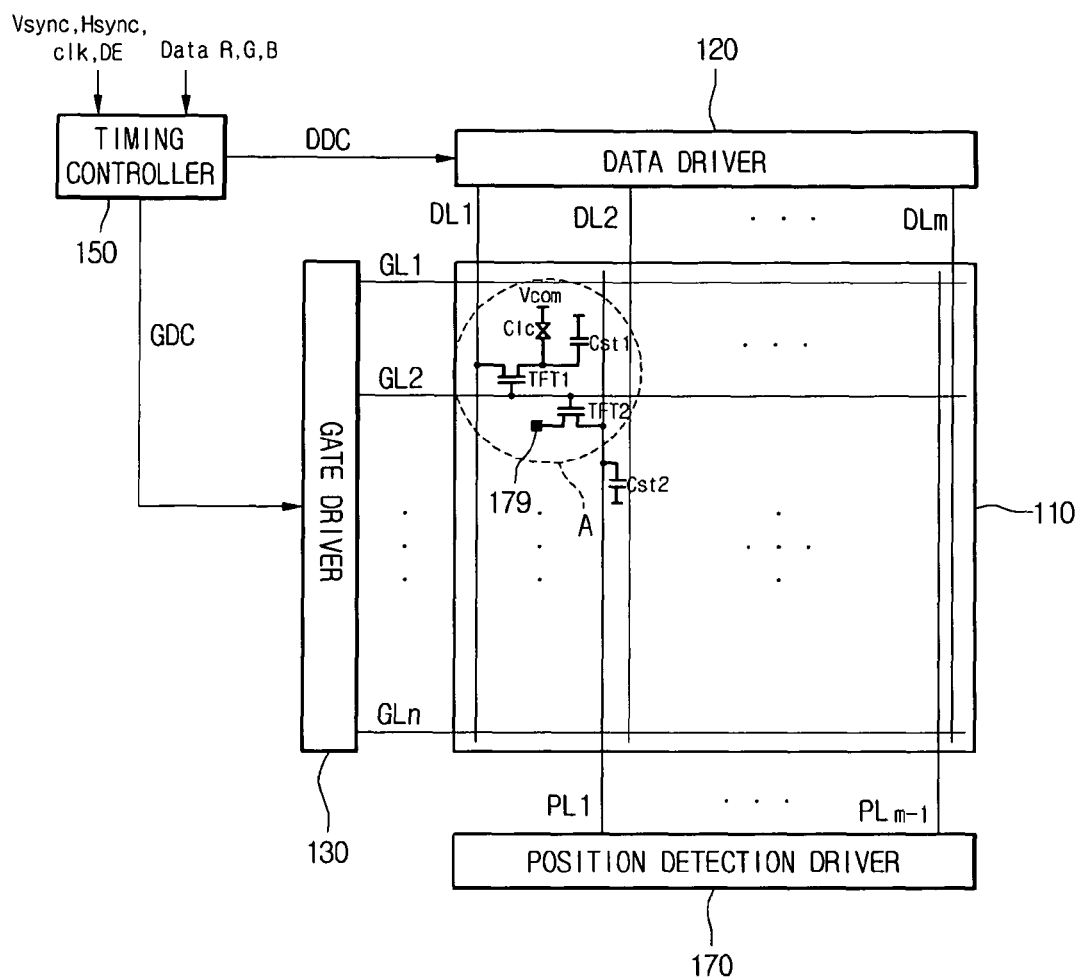
FIG. 1 is a schematic view illustrating a liquid crystal display device according to an embodiment.
Figure 2:
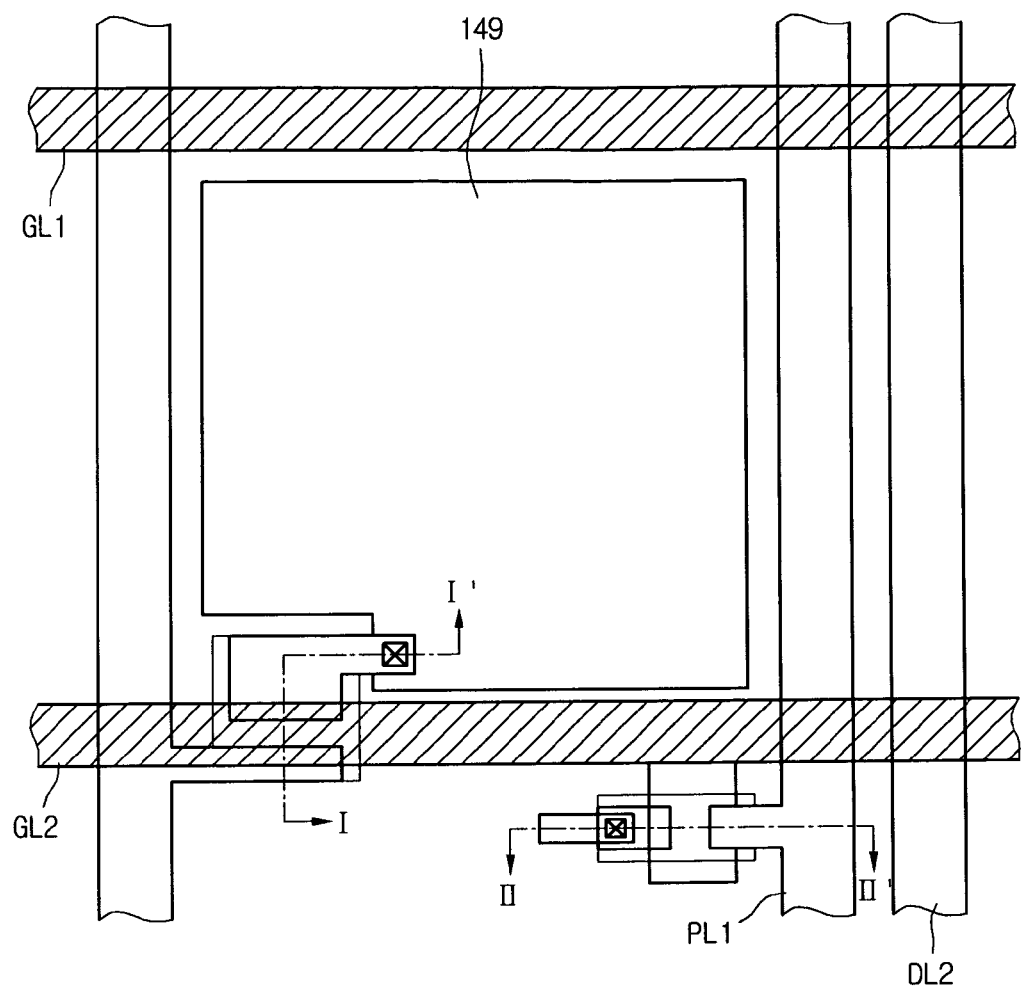
FIG. 2 is a plan view illustrating a pixel taken from a region A of FIG. 1.
Figure 3:
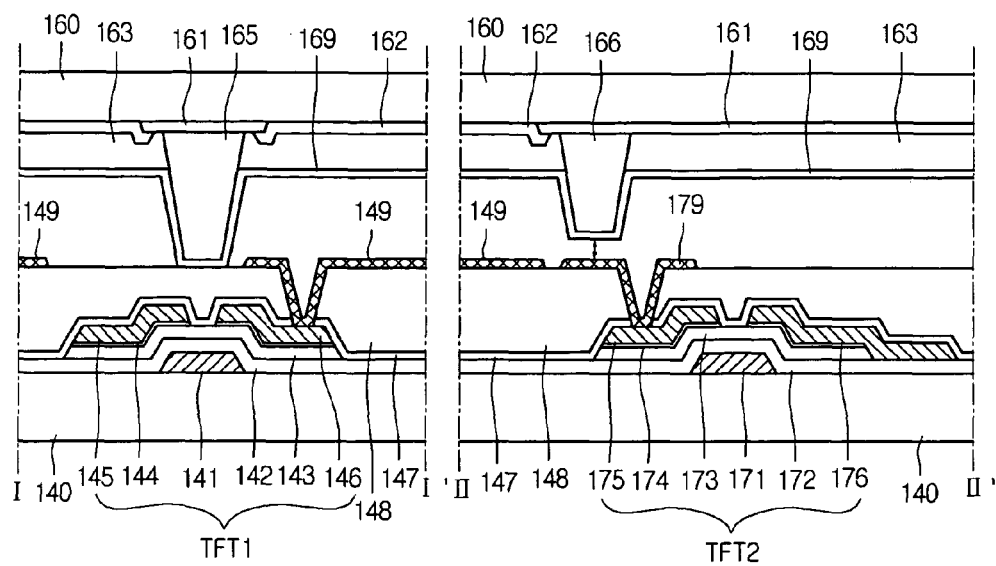
FIG. 3 is a cross-sectional view illustrating a liquid crystal display device taken along lines I-I' and II-II' of FIG. 2.

FIG. 1 is a schematic view illustrating a liquid crystal display device according to an embodiment. FIG. 2 is a plan view illustrating a pixel taken from a region A of FIG. 1. FIG. 3 is a cross-sectional view illustrating a liquid crystal display device taken along lines I-I' and II-II' of FIG. 2.

Referring to FIGS. 1 to 3, the liquid crystal display device includes a liquid crystal display panel 110, a data driver 120, a gate driver 130, and a timing controller 150. The liquid crystal display panel 110 includes a color filter substrate and a thin film transistor substrate that are attached to each other. The data driver 120 supplies data signals to data lines DL1 through DLm of the liquid crystal display panel 110. The gate driver 130 supplies scan signals to gate lines GL1 through GLn of the liquid crystal display panel 110. The timing controller 150 controls the data driver 120 and the gate driver 130.

The gate lines GL1 through GLn cross the data lines DL1 through DLm at the thin film transistor substrate of the liquid crystal display panel 110, to form cross portions where first thin film transistors TFT1 for driving liquid crystal cells Clc are disposed.

The thin film transistor substrate of the liquid crystal display panel 110 further includes position detection lines PL1 through PLm−1 and a position detection driver 170. The position detection lines PL1 through PLm−1 are parallel with the data lines DL1 through DLm. The position detection driver 170 is adapted to supply a constant position detection voltage to the position detection lines PL1 through PLm−1.

The first thin film transistors TFT1 are disposed at the liquid crystal cells Clc of the thin film transistor substrate, respectively. The first thin film transistors TFT1 serve as a switch device. First gate electrodes 141 of the first thin film transistors TFT1 are connected to the gate lines GL1 through GLn. First source electrodes 145 are connected to the data lines DL1 through DLm. A first drain electrode 146 is connected to a pixel electrode 149 of the liquid crystal cell Clc and one electrode of a first storage capacitor Cst1. A common voltage Vcom is supplied to a common electrode of the liquid crystal cell Clc. When the first thin film transistor TFT1 is turned on, the first storage capacitors Cst1 are charged with data voltages supplied from the data lines DL1 through DLm to maintain the liquid crystal cell Clc at a constant voltage.

Second thin film transistors TFT2 are disposed in portions of the thin film transistor substrate where the gate lines GL1 through GLn cross the position detection lines PL1 through PLm−1. Second gate electrodes 171 of the second thin film transistors TFT2 are connected to the gate lines GL1 through GLn. Second source electrodes 176 are connected to the position detection lines PL1 through PLm'1. A second drain electrode 175 is connected to a sensing electrode 179.

Second storage capacitors Cst2 for detecting a position are provided to the position detection lines PL1 through PLm−1. The second storage capacitor Cst2 is adjacent to the second source electrode 176 of the second thin film transistor TFT2 and charged with the constant position detection voltage supplied from the position detection driver 170.

The color filter substrate of the liquid crystal display panel 110 includes a protrusion pattern 166 and a support pattern 165. The protrusion pattern 166 is disposed in a corresponding region to the second drain electrode 175 of the second thin film transistor TFT2. The support pattern 165 is adapted to keep a constant gap between the color filter substrate and the thin film transistor substrate. A transparent conductive layer 169 is disposed on the protrusion pattern 166 and the support pattern 165.

When scan pulses are sequentially supplied to the gate lines GL1 through GLn, the first thin film transistors TFT1 are turned on, and channels are formed between the source electrodes 145 and the first drain electrodes 146, so that voltages of the data lines DL1 through DLm are supplied to the pixel electrodes 149 of the liquid crystal cells Clc. At this point, molecular arrangement of the liquid crystal cells Clc are changed according to electric fields between the pixel electrodes 149 and the common electrodes, to modulate incident light.

In addition, when the scan pulses are sequentially supplied to the gate lines GL1 through GLn, the second thin film transistors TFT2 are turned on, and channels are formed between the second source electrodes 176 and the second drain electrodes 175, so that the second storage capacitors Cst2 are charged with the position detection voltages from the position detection lines PL1 through PLm−1.

The data driver 120 supplies a data signal to the data lines DL1 through DLm in response to a data drive control signal DDC supplied from the timing controller 150. Also, the data driver 120 samples and latches an image data "Data R, G, B" input from the timing controller 150, then converts the latched data into an analogue data voltage by a gamma reference voltage, and then supplies the converted data to the data lines DL1 through DLm. The gamma reference voltage is supplied from a gamma reference voltage generation unit (not shown) through a gamma reference voltage selection unit (not shown). The analogue data voltage is used to express a gray scale in the liquid crystal cell Clc of the liquid crystal display panel 110.

The data drive control signal supplied from the timing controller 150 includes SSP, SSC, SOE, and POL.

The gate driver 130 sequentially generates the scan pulses using a gate drive control signal GDC supplied from the timing controller 150 and supplies the generated scan pulses to the gate lines GL1 through GLn.

The GDC supplied from the timing controller 150 includes GSP, GSC, and GOE.

The position detection driver 170 generates the position detection voltages, and when the second thin film transistors TFT2 are turned on by the scan signals supplied to the gate lines GL1 through GLn, the position detection driver 170 supplies the position detection voltages to the position detection lines PL1 through PLm−1 and the second storage capacitors Cst2 are charged with the position detection voltages. At this point, when the liquid crystal display panel 110 is touched with a finger or a pen, the protrusion pattern 166 disposed on the color filter substrate in a corresponding pixel contacts the second drain electrode 175 of the second thin film transistor TFT2, so that potential of the position detection voltage stored in the second storage capacitor Cst2 is changed. More particularly, since the transparent conductive layer 169 is disposed on the protrusion pattern 166, and a driving signal is supplied to the transparent conductive layer 169, when the transparent conductive layer 169 contacts the second drain electrode 175, the potential of the position detection voltage stored in the adjacent second storage capacitor Cst2 is changed.

The potential change of the position detection voltage is used to determine position coordinates in an x-axis direction (a perpendicular direction to the position detection lines). Position coordinates in a y-axis direction (a perpendicular direction to the gate lines) is determined through feedback of a gate control signal supplied to turn on the second thin film transistor TFT2.

The liquid crystal display device includes the second thin film transistor TFT2 in the portions where the gate lines GL1 through GLn cross the position detection lines PL1 through PLm−1, and the protrusion pattern 166 at the color filter substrate corresponding to the second drain electrode 175 of the second thin film transistor TFT2. Thus, x-axis position coordinates are detected by bringing the transparent conductive layer 169 disposed on the protrusion pattern 166 in contact with the second drain electrode 175 through touching, and y-axis position coordinates are detected with the gate control signal. This makes it possible to realize a display device integrated with a multi-touch function.

At this point, a driving signal, supplied to the transparent conductive layer 169 of the color filter substrate, is refreshed by respective frames. The driving signal may be the common voltage Vcom supplied to the liquid crystal display panel 110.

Thus, according to this embodiment, the second thin film transistor TFT2 is disposed in the cross portions of the gate lines GL1 through GLn and the position detection lines PL1 through PLm−1, and the protrusion pattern 166 is provided to the color filter substrate corresponding to the second drain electrode 175 of the second thin film transistor TFT2. This makes it to realize a display device having both a touch function and slim design.

Also, according to this embodiment, the multi-touch is possible, and y-axis position coordinates are detected with the gate control signal, thus only the position detection driver 170 for detecting x-axis position coordinates is provided, thereby achieving simple structure.

The structure of the thin film transistor substrate and the color filter substrate in the liquid crystal display device will now be described in more detail with reference to FIG. 3.

The thin film transistor substrate includes the first and second gate electrodes 141 and 171 on a first mother substrate 140, and gate dielectrics 142 and 172 are formed on the first mother substrate 140 with the first and second gate electrodes 141 and 171.

First and second active patterns 143 and 173 are disposed on the gate dielectrics 142 and 172, and first and second ohmic contact patterns 144 and 174 are disposed on the first and second active patterns 143 and 173.

The first source electrode 145 and the first drain electrode 146 are disposed on the first active pattern 143 and the first ohmic contact pattern 144. The second source electrode 176 and the second drain electrode 175 are disposed on the second active pattern 173 and the second ohmic contact pattern 174.

A passivation layer 147 is disposed on the gate dielectrics 142 and 172 with the first and second source electrodes 145 and 176 and the first and second drain electrodes 146 and 175. A first planarization layer 148 is disposed on the passivation layer 147.

Contact holes are disposed in the first planarization layer 148 to expose the first and second drain electrodes 146 and 175.

The first drain electrode 146 is electrically connected to the pixel electrode 149, and the second drain electrode 175 contacts the sensing electrode 179. That is, the pixel electrode 149 and the sensing electrode 179 are disposed on the first planarization layer 148.

The color filter substrate includes light-blocking patterns 161 on a second mother substrate 160 facing the thin film transistor substrate such that the light-blocking patterns 161 correspond to the gate lines GL1 through GLn of FIG. 1, the data lines DL1 through DLm of FIG. 1, and the first and second thin film transistor TFT1 and TFT2.

A color filter 162 is disposed on the second mother substrate 160 with the light-blocking patterns 161. The color filter 162 may be any one of a red color filter, a green color filter, and a blue color filter.

The support pattern 165 and the protrusion pattern 166 are disposed on the light-blocking patterns 161. An end of the support pattern 165 contacts the thin film transistor substrate, but an end of the protrusion pattern 166 does not contact the thin film transistor substrate. The support pattern 165 is longer than the protrusion pattern 166. That is, only an external pressure (an arrow of FIG. 3) brings the protrusion pattern 166 in contact with the thin film transistor substrate.

A second planarization layer 163 is disposed on the light-blocking patterns 161 and the color filter 162, except for the support pattern 165 and the protrusion pattern 166. The transparent conductive layer 169 is disposed on the protrusion pattern 166 and the support pattern 165 with the second planarization layer 163.

FIGS. 4A to 4E are cross-sectional views illustrating a method of manufacturing a thin film transistor substrate according to an embodiment.

Figure 4A:
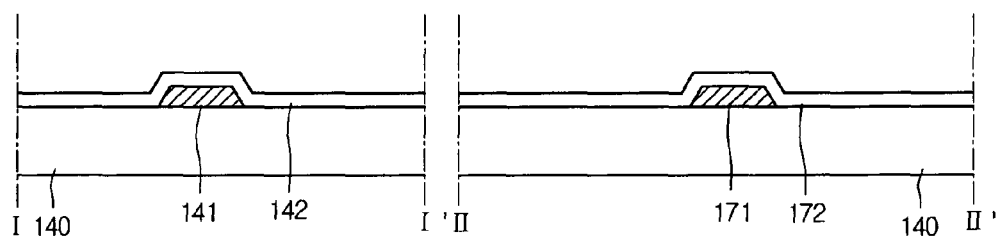
FIGS. 4A to 4E are cross-sectional views illustrating a method of manufacturing a thin film transistor substrate according to an embodiment.

Referring to FIG. 4A, a conductive material is formed on a first mother substrate 140 through a depositing method such as a sputtering process, and first and second gate electrodes 141 and 171 are formed through a photolithography process and an etching process with a mask. Although not shown, the first and second gate electrodes 141 and 171 and gate lines are simultaneously formed.

The first and second gate electrodes 141 and 171 contain any one of metals including aluminum (Al), aluminum alloy (AlNd), tungsten (W), copper (Cu), molybdenum (Mo), chrome (Cr) and molybdenum-tungsten (MoW).

Gate dielectrics 142 and 172 are deposited on the first mother substrate 140 with the first and second gate electrodes 141 and 171.

The gate dielectrics 142 and 172 may be one of a silicon nitride (SiNx) layer, a silicon oxide (SiO2) layer, and a stacked layer of the silicon nitride (SiNx) and silicon oxide (SiO2) layers, which are formed through any one of a chemical vapor deposition method and a sputtering method.

Figure 4B:
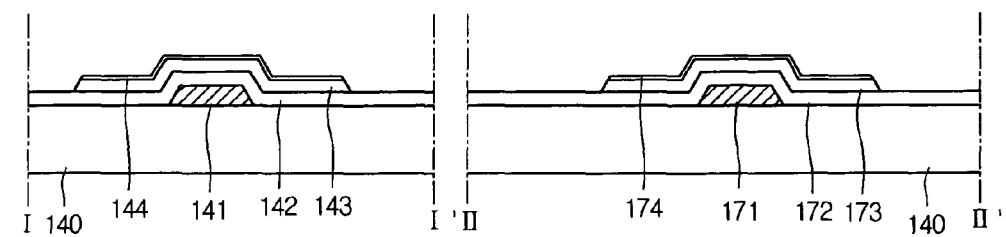
Figure 4C:
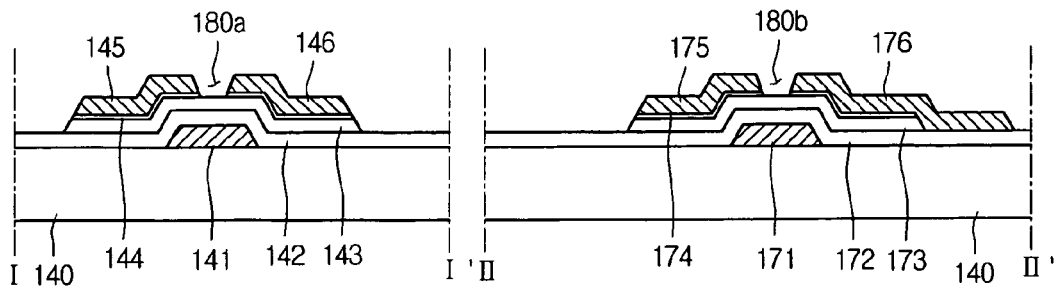

Referring to FIGS. 4B and 4C, an amorphous silicon layer, an impurity-doped amorphous silicon layer, and a conductive layer are sequentially stacked on the gate dielectrics 142 and 172, and then a photolithography process and an etching process with a mask are performed such that a first active pattern 143, a first ohmic contact pattern 144, a first source electrode 145, and a first drain electrode 146 are formed in a region corresponding to the first gate electrode 141, and simultaneously, a second active pattern 173, a second ohmic contact pattern 174, a second source electrode 176, and a second drain electrode 175 are formed in a region corresponding to the second gate electrode 171.

The source electrode 145 and the first drain electrode 146 are separated by a first contact hole 180a, and the second source electrode 176 and the second drain electrode 175 are separated by a second contact hole 180b.

Figure 4D:
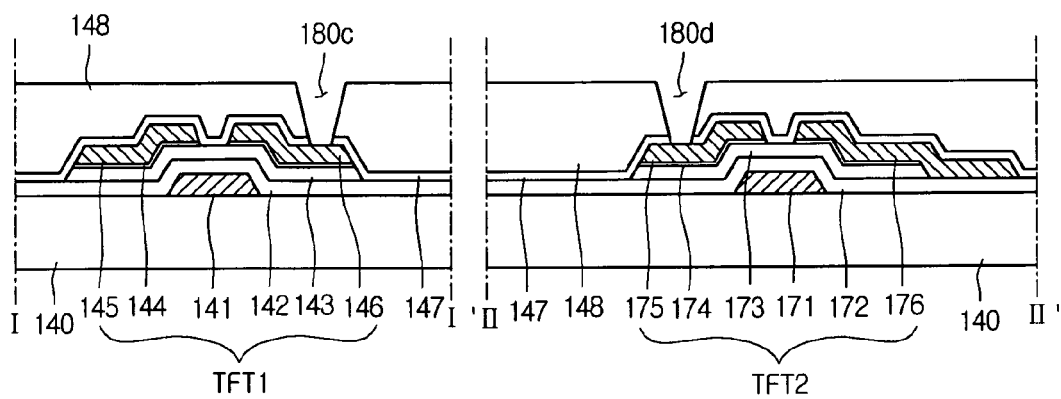

Referring to FIG. 4D, a passivation layer 147 is formed on an entire surface of the first mother substrate 140 with first and second thin film transistor TFT1 and TFT2.

A first planarization layer 148 is formed on the passivation layer 147, and third and fourth contact holes 180c and 180d are formed in the first planarization layer 148 through a photolithography process and an etching process to expose the first and second drain electrodes 146 and 175 to the outside.

Figure 4E:
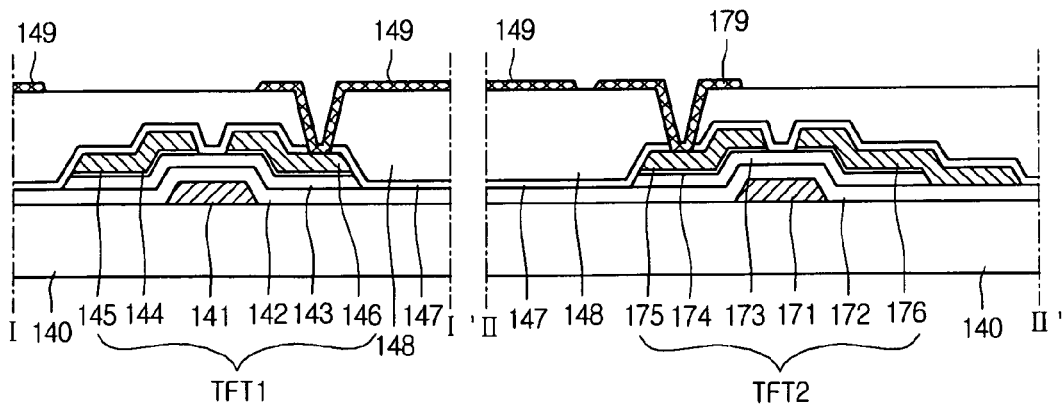

Referring to FIG. 4E, any one of transparent conductive metal groups including indium-tin-oxide (ITO) or indium-zinc-oxide (IZO) is deposited on an entire surface of the first planarization layer 148 with the third and fourth contact holes 180c and 180d, then a photolithography process and an etching process using a mask to form a pixel electrode 149 and a sensing electrode 179.

FIGS. 5A to 5D are cross-sectional views illustrating a method of manufacturing a color filter substrate according to an embodiment.

Figure 5A:
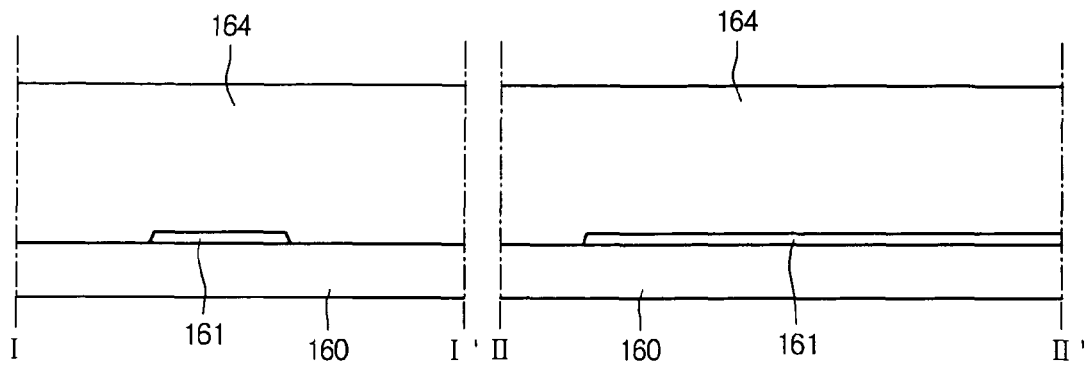
FIGS. 5A to 5D are cross-sectional views illustrating a method of manufacturing a color filter substrate according to an embodiment.

Referring to FIG. 5A, light-blocking patterns 161 are formed on a second mother substrate 160 of the color filter substrate facing a thin film transistor substrate. The light-blocking patterns 161 contain a carbonate based organic material or a metal thin film including chrome and are formed through a photolithograph process and an etching process.

A high-molecular organic material 164 is applied on the second mother substrate 160 with the light-blocking patterns 161.

Figure 5B:
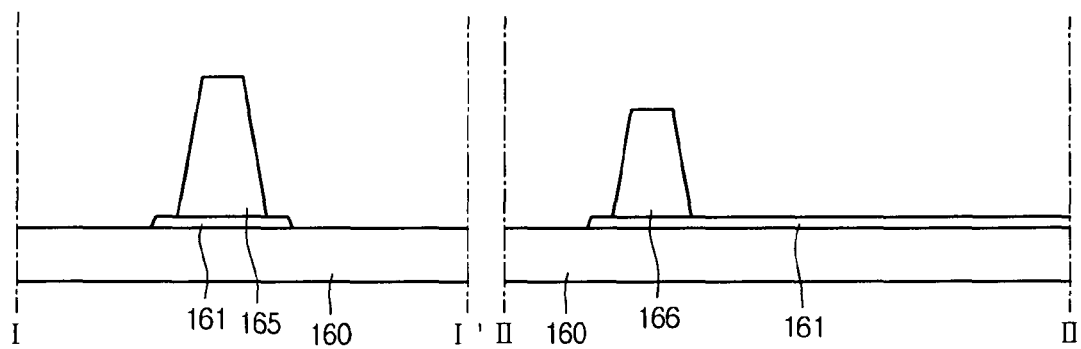

Referring to FIG. 5B, a photolithography process and an etching process with a diffraction mask is performed on the high-molecular organic material 164 to form a support pattern 165 and a protrusion pattern 166.

An exposure amount of the support pattern 165 are greater than that of the protrusion pattern 166 by controlling the exposure amounts according to a diffraction intensity of the diffraction mask such that the support pattern 165 has a larger thickness than the protrusion pattern 166.

Figure 5C:
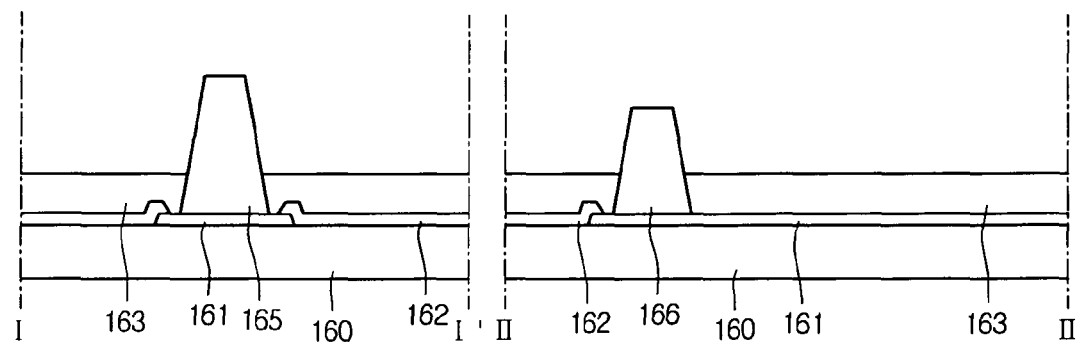

Referring to FIG. 5C, on the basis of a boundary of the light-blocking patterns 161, a color filter 162 is formed on the second mother substrate 160 corresponding to a pixel.

The color filter 162 may be formed as any one of red, green and blue color filters, and be out of the support pattern 165 and the protrusion pattern 166.

A second planarization layer 163 is formed on the second mother substrate 160 with the color filter 162 and the light-blocking patterns 161.

The second planarization layer 163 protects the color filter 162 and planarizes the second mother substrate 160 and has a less thickness than those of the support pattern 165 and the protrusion pattern 166.

Figure 5D:
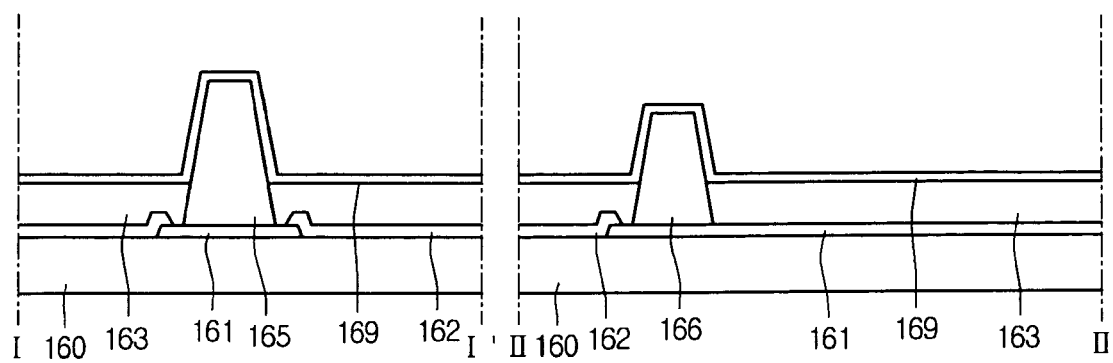

Referring to FIG. 5D, any one of a transparent conductive metal groups including indium-tin-oxide (ITO) or indium-zinc-oxide (IZO) is deposited on the second planarization layer 163 with the support pattern 165 and the protrusion pattern 166, to from a transparent conductive layer 169.

As described above, the liquid crystal display device according to the embodiment includes the thin film transistor for detecting positions in the portions where the gate lines and the position detection lines of the thin film transistor substrate cross each other, and the protrusion pattern is provided to the color filter substrate corresponding to the drain electrode of the thin film transistor. Thus, when being pressed by an external touch, the transparent conductive layer disposed on the protrusion pattern contacts the drain electrode to detect the position detection voltage change of the storage capacitor disposed at the position detection line adjacent to the thin film transistor, so that x-axis position coordinates are detected, and y-axis position coordinates are detected with the feedback of the gate control signal. This makes it possible to realize a display device integrated with the touch function.

Thus, according to the embodiments, a display device having both a touch function and slim design can be realized.

Also, the multi-touch is possible, and y-axis position coordinates are detected with the gate control signal, thus only the position detection driver detecting x-axis position coordinates is provided, thereby achieving simple structure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
   a plurality of gate lines and a plurality of data lines crossing each other on a first substrate, to define a pixel;
   a first thin film transistor in a portion where the gate lines and the data lines cross each other;
   a plurality of position detection lines on the first substrate, the position detection lines spaced a constant distance from the data lines and crossing the gate lines;
   a second thin film transistor for detecting a position, in a portion on the first substrate where the gate lines and the position detection lines cross each other;
   a protrusion pattern protruding from a second substrate and corresponding to a drain electrode of the second thin film transistor; and
   a transparent conductive layer on the protrusion pattern, electrically connected to the drain electrode when touching,
   wherein x-axis position coordinates are detected by bringing the transparent conductive layer disposed on the protrusion pattern in contact with the second drain electrode of the second thin film transistor through touching and y-axis position coordinates are detected with the gate control signal supplied to turn on the second thin film transistor.

2. The display device according to claim 1, wherein a sensing electrode contacting the transparent conductive layer is disposed on the drain electrode.

3. The display device according to claim 1, wherein the position detection line comprises a storage capacitor, and the storage capacitor is disposed in an adjacent region to the second thin film transistor and stores a position detection voltage when the second thin film transistor is turned on.

4. The display device according to claim 1, further comprising a support pattern on the second substrate to maintain a constant gap between the first substrate and the second substrate.

5. The display device according to claim 4, wherein the transparent conductive layer is disposed on the protrusion pattern and the support pattern.

6. A method of manufacturing a display device, the method comprising:
   forming a thin film transistor substrate comprising: forming a first thin film transistor in a portion where gate lines and data lines cross each other; and forming a second thin film transistor in a portion where and the gate lines and position detection lines spaced a constant distance from the data lines cross each other; and
   forming a color filter substrate comprising a protrusion pattern in a portion corresponding to a drain electrode of the second thin film transistor,
   wherein x-axis position coordinates are detected by bringing the transparent conductive layer disposed on the protrusion pattern in contact with the second drain electrode of the second thin film transistor through touching and y-axis position coordinates are detected with the gate control signal supplied to turn on the second thin film transistor.

7. The method according to claim 6, further comprising forming a sensing electrode electrically connected to the drain electrode of the second thin film transistor.

8. The method according to claim 6, wherein the protrusion pattern is spaced a constant distance from the drain electrode, and a transparent conductive layer is formed on the protrusion pattern.

9. The method according to claim 6, further comprising forming a support pattern simultaneously with forming the protrusion pattern, wherein the support pattern maintains a gap between the thin film transistor substrate and the color filter substrate.

* * * * *